United States Patent [19]
Crunk

[11] Patent Number: 6,150,765
[45] Date of Patent: Nov. 21, 2000

[54] FLASHER WITH AUDIBLE INDICATOR

[76] Inventor: Paul D. Crunk, Box 725, Taylor, Mich. 48180-0725

[21] Appl. No.: 09/199,618

[22] Filed: Nov. 25, 1998

[51] Int. Cl.[7] ........................................... B60Q 1/52
[52] U.S. Cl. ........................... 315/129; 315/133; 340/463
[58] Field of Search .................... 315/119, 120, 315/129, 136, 133, 135, 200 A; 340/463, 474, 475

[56] References Cited

U.S. PATENT DOCUMENTS 5,477,208  12/1995  Henderson et al. .................... 340/471

Primary Examiner—David Vu
Attorney, Agent, or Firm—Harness, Dickey & Pierce, P.L.C.

[57] ABSTRACT

A signaling lamp flasher generates audible sound while controlling intermittent contact between a vehicle power source and a signaling lamp. A flash control device generates the intermittent contact, and is preferably an input relay disposed between the power source and the signaling lamp. An IC-based audible flash circuit generates a control pulse in response to the voltage pulse from the power source, generates a buzzer pulse in response to the control pulse, and generates audible sound in response to the buzzer pulse. The signaling lamp flasher also provides current overload protection at the signaling lamp through a pop-out resettable fuse. The location and ability of the fuse to be reset provides improved dependability and serviceability.

15 Claims, 2 Drawing Sheets

FLASHER WITH AUDIBLE INDICATOR

TECHNICAL FIELD

This invention relates generally to vehicle exterior lighting which includes a flasher to enable the lamp or lamps to flash. More particularly, the invention relates to vehicle signaling lamp flashers with audible capability, improved dependability, and improved serviceability.

BACKGROUND

The transportation industry widely uses signaling lamps to provide autos, truck and pull-behind vehicles and other vehicle extensions with the ability to signal to other vehicles. Ordinarily, these lamps must perform the functions of a tail light, turn signal and stop light with the use of a flasher switch in a given situation. The term signaling lamp is used herein to refer to lamps capable of performing any or all of these functions. State and federal laws typically require signaling lamps in an effort to ensure safe driving on roadways. One reason for the concern for safety is drivers in auto and trucks forget that their turn signal is on and or can't hear it (or don't see it flashing on their dash panel). Also, large trucks with very large trailers often have significant blind spots which can present a hazard to other motorists. For example, when a truck driver desires to change lanes, the driver can do no more than pay close attention to the side mirrors and properly use the vehicle turn signal. The turn signal triggers a signaling lamp flasher which generates intermittent contact between the vehicle power source and the signaling lamp to create a flashing light. An inattentive motorist, however, can easily be caught by surprise in this scenario—especially if the truck driver or automotive driver forgets to cancel the turn signal, or the turn signal fails to cancel by itself (and if the motorist fails to see the flashing lights). In fact, many accidents are caused each year by motorists momentarily taking their eyes off of the vehicle in front of them. There is therefore a substantial need to provide signaling lamps for automotive and large trucks and tractor trailers with the ability to better obtain the attention of the operating driver of the auto or truck.

Another important consideration to note is that it would also be very beneficial to alert the truck driver that the signaling lamp is operating properly or that the lamps are flashing. For example, if a signaling lamp fails due to a current overload, the truck driver will often have no knowledge of the failed signaling lamp and will therefore continue to operate the vehicle as if nothing is wrong. Typically, the driver will remain unaware of the problem until he receives a ticket or another driver notifies him.

As alluded to above, signaling lamps are also prone to current overloads, and they therefore rely heavily upon the fuse protection provided by the vehicle. This protection, however, is often not effective because the fuse will typically be responsible for protecting other devices throughout the vehicle as well. The result is that local current surges will still cause damage to the signaling lamp and its components. Providing an easily serviceable circuit protection device which is local to the lamp would also aid repair personnel in troubleshooting wiring problems. It is therefore desirable to provide signaling lamps with dedicated current overload protection to improve dependability and serviceability within the flasher unit.

SUMMARY OF THE INVENTION

The present invention provides a signaling lamp flasher with the ability to audibly gain the attention of the driver of the vehicle. The present invention also achieves improved dependability and serviceability by providing dedicated current overload protection in the flasher itself.

The generation of audible sound is achieved through an audible flash circuit, which uses an integrated circuit (IC) to control operation of a buzzer. Use of the IC also provides independence between the flash rate and the load on the flasher.

The current overload protection further increases serviceability by providing a resettable circuit protection device. By allowing repair personnel such as the driver to reset the circuit protection device, complete repair of wiring problems can be immediately addressed or postponed until the driver reaches a suitable service location.

Further objects, features and advantages of the invention will become apparent from a consideration of the following description and the appended claims when taken in connection with the accompanying drawings.

BRIEF DESCRIPTION OF THE DRAWINGS

A more complete appreciation of the invention and the many attendant advantages thereof will be readily obtained as the same becomes better understood by reference to the following detailed description when considered in connection with accompanying drawings, wherein.

DETAILED DESCRIPTION OF THE INVENTION

Figure 1:
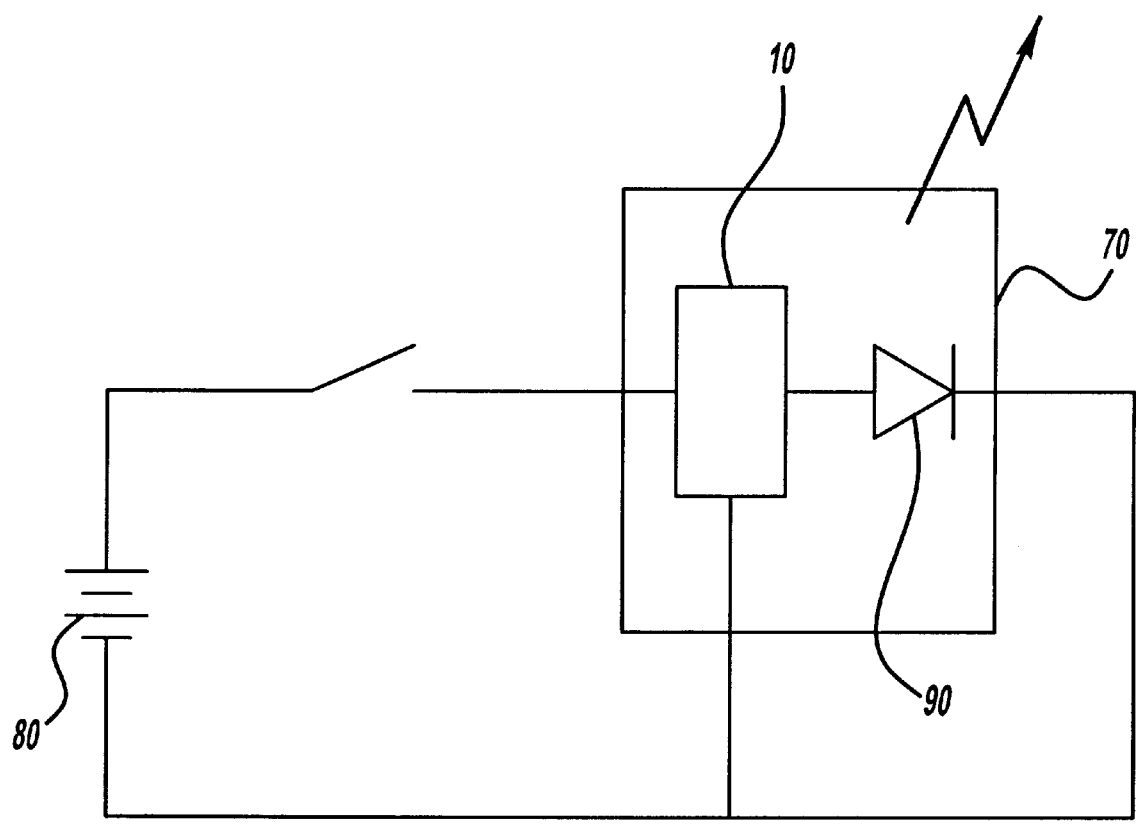
FIG. 1 is a basic schematic of a system employing the signaling lamp flasher of the present invention.
Figure 2:
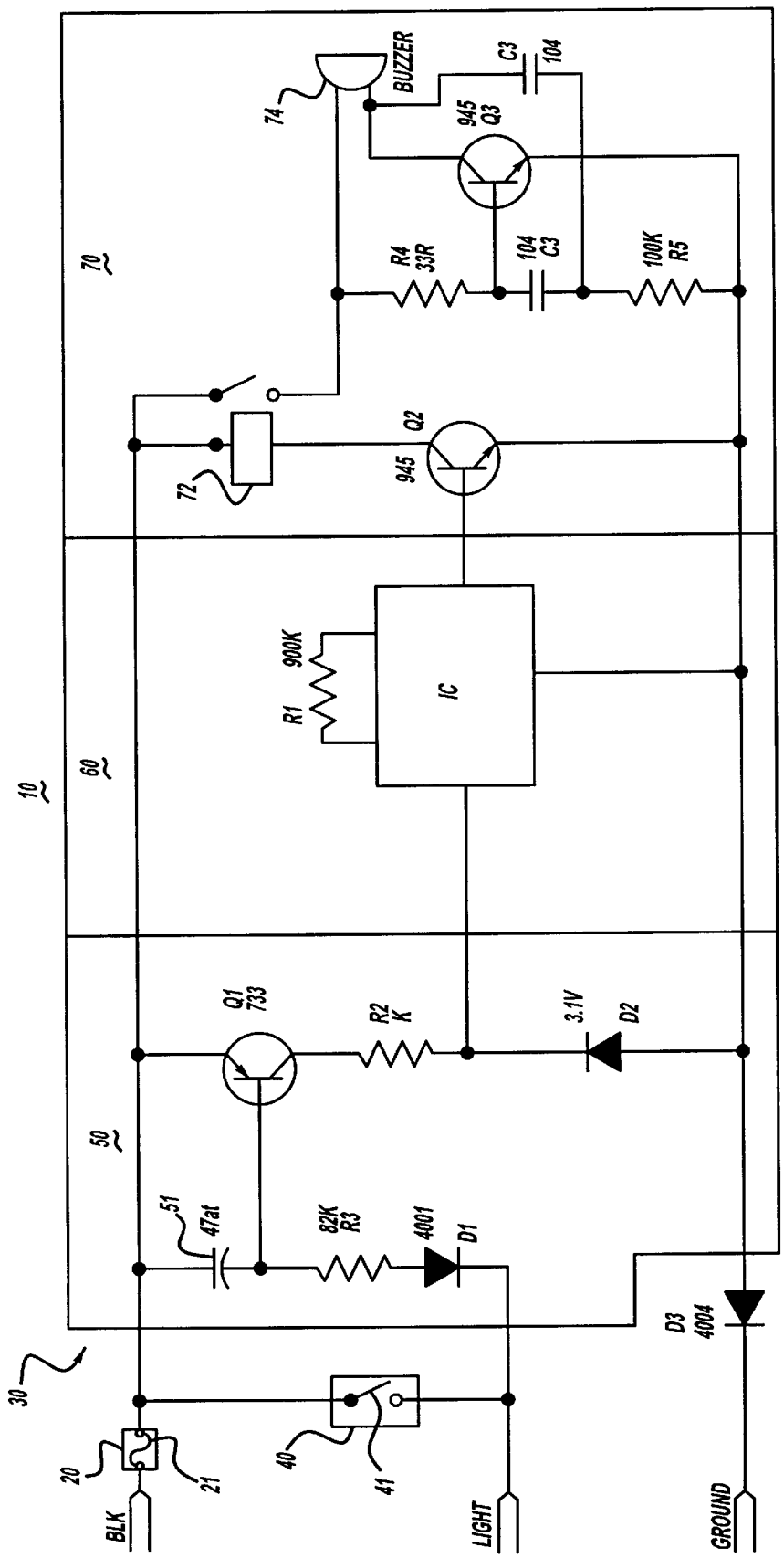
FIG. 2 is a circuit diagram of the signaling lamp flasher of the present invention.

Turning now to FIGS. 1 and 2, the signaling lamp flasher, indicated generally at 10, includes a flash control device 40, an audible flash circuit 30, and a circuit protection device 20. These elements generate audible sound and control intermittent contact between a power source 80 and a light source 90 in response to a voltage pulse from the power source 80. It should be understood that both the signaling lamp flasher 10 and the light source 90 can be located within the same signaling lamp 100.

The audible flash circuit 30 includes an IC input circuit 50, an IC 60, and an IC output circuit 70. The IC input circuit 50 has a source capacitor 51, an input transistor Q1, a plurality of input current resistors R2 & R3, an input diode D1, and a zener diode D2. The IC output circuit 70 has an IC transistor Q2, an output relay 72, a plurality of output current resistors R4 & R5, a buzzer 74, a buzzer transistor Q3, a plurality of isolation capacitors C3, and a grounding diode D3.

In operation, the signaling lamp flasher 10 generates audible sound and controlled intermittent contact between the power source 80 and the light source 90 in response to voltage pulses from the power source 80. Upon receiving a voltage pulse from the power source 80, the flash control device 40 generates the intermittent contact. Also, the audible flash circuit 30 generates the audible sound in conjunction with the intermittent contact. Further, the circuit protection device 20 protects the flash control device 40, the audible flash circuit 30, and the light source 90 from current overloads. Preferably, the circuit protection device 20 is a resettable pop-out fuse 21 rated at 25A, and the flash control device 40 is an input relay or solid state device 41 disposed between the power source 80 and the light source 90.

Generally, the audible flash circuit 30 uses an IC input circuit 50 to generate a control pulse in response to the voltage pulse. Also, the flash circuit 30 used an IC 60 to generate a buzzer pulse in response to the control pulse. An IC output circuit 70 is used to generate the audible sound in response to the buzzer pulse. It is important to note that many conventional circuit designs can be used to generate the audible sound and that the audible flash circuit 30 described herein is only considered to be the preferred embodiment of the present invention. In the IC input circuit 50, the source capacitor 51 creates a source voltage in response to the voltage pulse. The source voltage supplies both the IC input circuit 50 and the IC output circuit 70. A small capacitance value for the source capacitor 51 allows the flasher 10 to operate at currents as low as approximately 20 mA and as high as approximately 20A. The input transistor Q1 then generates an IC input current in response to the source voltage. The plurality of input current resistors R2 & R3 limit the IC input current. The input diode D1 isolates the input transistor Q1. The zener diode D2 generates the control pulse in response to the IC input current. Preferably, the source capacitor 51 is an electrolytic capacitor with a value of approximately 47 aF. The input transistor Q1 is a pnp bipolar junction transistor, and the zener diode D2 is rated at 3.1V.

In the IC output circuit 70, the IC transistor Q2 generates an IC output current in response to the buzzer pulse. The output relay 72 creates a buzzer transistor current in response to the IC output current. The plurality of output current resistors R4 & R5 limit the buzzer transistor current, while the buzzer 74 generates the audible sound. The buzzer transistor Q3 creates a buzzer current in response to the buzzer transistor current. The buzzer current causes the buzzer 74 to generate the audible sound. The plurality of isolation capacitors C3 isolate the buzzer 74 and the buzzer transistor Q3. The grounding diode D3 prevents ground loop current in the signaling lamp flasher 10. Preferably, the IC transistor Q2 and the buzzer transistor Q3 are npn bipolar junction transistors.

It is to be understood that the invention is not limited to the exact construction illustrated and described above, but that various changes and modifications may be made without departing from the spirit and scope of the invention as defined in the following claims.

What is claimed is:

1. A signaling lamp flasher comprising:
   a flash control device for generating intermittent contact between a power source and a light source in response to a voltage pulse from the power source, the voltage pulse corresponding to an operator request to illuminate the light source; and
   an audible flash circuit for generating audible sound in conjunction with the intermittent contact.

2. The signaling lamp flasher of claim 1, further comprising a circuit protection device for protecting the flash control device, the audible flash circuit, and the light source from current overloads.

3. The signaling lamp flasher of claim 2 wherein the circuit protection device comprises a pop-out fuse.

4. The signaling lamp flasher of claim 3 wherein the pop-out fuse is resettable.

5. The signaling lamp flasher of claim 1 wherein the flash control device comprises an input relay disposed between the power source and the light source.

6. The signaling lamp flasher of claim 1 wherein the audible flash circuit comprises:

an IC input circuit for generating a control pulse in response to the voltage pulse;

an IC for generating a buzzer pulse in response to the control pulse; and an IC output circuit for generating the audible sound in response to the buzzer pulse.

7. The signaling lamp flasher of claim 6 wherein the IC input circuit comprises:
   a source capacitor for creating a source voltage in response to the voltage pulse such that the source voltage supplies the IC input circuit and the IC output circuit;
   an input transistor for generating an IC input current in response to the source voltage;
   a plurality of input current resistors for limiting the IC input current;
   an input diode for isolating the input transistor; and
   a zener diode for generating the control pulse in response to the IC input current.

8. The signaling lamp flasher of claim 7 wherein the source capacitor is an electrolytic capacitor with a value of approximately 47 aF.

9. The signaling lamp flasher of claim 7 wherein the input transistor is a pnp bipolar junction transistor.

10. The signaling lamp flasher of claim 7 wherein the zener diode is rated at 3.1V.

11. The signaling lamp flasher of claim 6 wherein the IC output circuit comprises:
    an IC transistor for generating an IC output current in response to the buzzer pulse;
    an output relay for creating a buzzer transistor current in response to the IC output current;
    a plurality of output current resistors for limiting the buzzer transistor current;
    a buzzer for generating the audible sound;
    a buzzer transistor for creating a buzzer current in response to the buzzer transistor current such that the buzzer current causes the buzzer to generate the audible sound;
    a plurality of isolation capacitors for isolating the buzzer and the buzzer transistor; and
    a grounding diode to prevent ground loop current in the signaling lamp flasher.

12. The signaling lamp flasher of claim 11 wherein the IC transistor is an npn bipolar junction transistor.

13. The signaling lamp flasher of claim 11 wherein the buzzer transistor is an npn bipolar junction transistor.

14. An automotive audible flash circuit comprising:
    an input circuit for generating a control pulse based on a voltage pulse from an automotive turn signaling circuit;
    an IC for generating a buzzer pulse based on the control pulse; and
    an output circuit for generating an audible sound in response to the buzzer pulse.

15. The flash circuit of claim 14 wherein the input circuit includes a source capacitor for creating a source voltage in response to the voltage pulse such that the source voltage supplies the input circuit and the output circuit.

* * * * *

UNITED STATES PATENT AND TRADEMARK OFFICE
CERTIFICATE OF CORRECTION

PATENT NO. : 6,150,765
DATED : November 21, 2000
INVENTOR(S) : Paul D. Crunk

It is certified that error appears in the above-identified patent and that said Letters Patent is hereby corrected as shown below:

Column 1,
Line 22, "auto" should be --autos--

Column 1,
Line 22, "and" (second occurrence) should be deleted

Signed and Sealed this

Tenth Day of July, 2001

*Attest:*

NICHOLAS P. GODICI
*Attesting Officer*       *Acting Director of the United States Patent and Trademark Office*